United States Patent [19]

Carrell

[11] 4,191,170

[45] Mar. 4, 1980

[54] SOLAR PANEL

[76] Inventor: David R. Carrell, P.O. Box 895, Yakima, Wash. 98907

[21] Appl. No.: 844,421

[22] Filed: Oct. 21, 1977

[51] Int. Cl.² .............................................. F24J 3/02
[52] U.S. Cl. ................................................... 126/449
[58] Field of Search ............... 126/270, 271; 237/1 A

[56] References Cited

U.S. PATENT DOCUMENTS

| | | | |
|---|---|---|---|
| 807,642 | 12/1905 | Sides et al. | 126/271 |
| 2,625,930 | 1/1953 | Harris | 126/270 |
| 3,001,331 | 9/1961 | Brunton | 50/192 |
| 3,232,975 | 2/1966 | Gillette et al. | 136/89 |
| 3,910,253 | 10/1975 | Thomason et al. | 126/271 |
| 3,915,148 | 10/1975 | Fletcher et al. | 126/271 |
| 3,918,430 | 11/1975 | Stout et al. | 126/271 |
| 3,985,116 | 10/1976 | Kapany | 126/270 |
| 3,986,491 | 10/1976 | O'Hanlon | 126/271 |
| 3,991,740 | 11/1976 | Rabl | 126/270 |
| 4,037,583 | 7/1977 | Bakun et al. | 126/271 |
| 4,069,809 | 1/1978 | Strand | 126/270 |

*Primary Examiner*—Edward G. Favors

*Attorney, Agent, or Firm*—Dowrey & Cross

[57] ABSTRACT

The panel includes two V-corrugated sheets secured together with their corrugations in parallel alignment to form parallel channels, and two sidewalls closing the ends of the channels. The sheets are secured together along their edges and between channels. The outer surface of one sheet forms two sets of parallel absorptive faces which, with the panel inclined, are positionable parallel to the longitudinal axis of solar travel over the panel during each solar day, and perpendicular to the direction of incident solar radiation at summer solstice and winter solstice, respectively. Adjacent channels are connected intermediate their ends at one or more locations by transverse flow passages through which a heat exchange fluid may be transferred in a direction transverse to the lengths of the channels. The heat exchange fluid is introduced into the channel adjacent the upper edge of the panel and flows downward by gravity through the channels in sequence toward the channel adjacent the lower edge of the panel, from which it is discharged.

15 Claims, 4 Drawing Figures

SOLAR PANEL

BACKGROUND OF THE INVENTION

This invention relates to the collection of solar radiation and, more particularly, to solar panels of the non-tracking type.

Most prior solar panels are of the moveable tracking type, or the fixed-position non-tracking type. Tracking type solar panels maintain fairly constant collection efficiencies by actually tracking the sun and focusing collected solar radiation upon a suitable energy conversion device or media. Panels of this type, however, require relatively complex and, hence, costly positioning apparatus for maintaining the panel in proper longitudinal and elevational alignment with the longitudinal axis of solar travel over the collector during each solar day, and throughout the solar year.

Non-tracking solar panels do not require such positioning apparatus, typically can circulate larger amounts of heat exchange fluid, and generally are less expensive than tracking type panels. Non-tracking flat panels which include a single planar absorptive surface are ineffective on a seasonal basis because they provide peak collection efficiency at only one solar position. The non-tracking panels or solar heat collectors disclosed in U.S. Pat. Nos. 3,991,740, 3,986,491, 3,915,148, and 2,625,930, however, take into account variations in the angle of incident solar radiation during a solar day, or a solar year, as the case may be, and therefore maintain higher seasonal collection efficiencies more akin to those obtained by tracking type solar panels.

Until this invention, however, non-tracking solar panels or solar collectors have been unacceptable in many practical applications incident to the provision of simplified light weight, low cost solar heating systems for use with homes and other buildings. Typical panels or collectors of this type, especially those panels or collectors designed to take into account variations in the angle of incident solar radiation as exemplified by the panels or collectors disclosed in the aforementioned United States patents, utilize complicated focusing or reflective elements for directing incident solar radiation toward an appropriate heat collector, storage or utilization device, or media. Although the reflective or focusing elements used do not move, they must necessarily be of relatively complex construction in order to accomodate the range of incident radiation angles encountered throughout each solar year, or each solar day, as the case may be. Consequently, they tend to be costly and-/or bulky, and require substantial ancillary reinforcement or support in order to make them acceptable for installation and use with commercial home solar heating systems.

The simple roof covering disclosed in the U.S. Pat. No. 3,001,331, also takes into account the variation in the angles of incident solar radiation; but does not provide solar heat collection, solar heat impinging on the roof structure being reflected during the summer and absorbed during the winter.

SUMMARY OF THE INVENTION

This invention provides a solar panel which overcomes or substantially mitigates these and other problems associated with non-tracking solar panels of the type described by providing two, three or more discrete sets of parallel absorptine faces respectively positionable parallel to the longitudinal axis of solar travel in perpendicular relation to the direction of incident solar radiation at two, three or more predetermined solar positions, as the case may be. The radiation absorbed by these faces is transferred to a heat exchange fluid contained within a series of closed-ended parallel flow channels underlying these faces in thermally conductive relation therewith. The flow channels are connected intermediate the ends thereof to transmit the heat exchange fluid between adjacent channels in a direction transverse to the lengths thereof.

According to one preferred embodiment of the invention, two sets of absorptive faces, along with the associated closed-ended flow channels, are formed by two corrugated sheets secured together with their corrugations in parallel alignment. Opposed sheet surfaces are spaced apart at a plurality of locations along the lengths of the corrugations to form one, two or more transverse flow passages for transmitting a suitable heat exchange fluid between adjacent flow channels in a direction transverse to the lengths thereof. The size of these flow passages are selected to control the flow of heat exchange fluid through the channels in order to effect appropriate heat transfer with the absorptive faces.

According to further aspects of this one preferred embodiment of the invention, the two sheets are of generally similar corrugation outlines, with the faces of equal widths, and are partially offset transversely. The sheets are secured together by intermediate overlapping sheet joints along proximate offset portions thereof intervening between the flow channels. The aforementioned transverse flow passages are bounded by these proximate offset portions between the overlapping sheet joints.

Thus, it will be appreciated from the foregoing summary that this invention provides a solar panel which possesses versatility, reliability and economy heretofore unparalleled in the art pertaining to solar panels and the collection of solar radiation in general. It is possible, by inclining the panel with its absorptive faces parallel to the direction of solar travel, to obtain peak effective solar radiation collection at two, three or more predetermined solar positions, depending upon the number of sets of faces used. At each such position, therefore, one set of faces acts as the primary absorbers of incident solar radiation while the remaining set or sets act primarily as reflective surfaces. At the remaining solar positions, of course, the panel collection efficiency may decline somewhat on a seasonal basis as incident solar radiation impinges on the absorbtive faces at non-perpendicular angles of incidence; however, by providing sufficient numbers of sets of absorptive faces, the effects of seasonal fluctuation in collection efficiency may be minimized. Furthermore, it is possible to form the faces so that peak collection efficiency is obtained during the portions of the solar year which are most desirable from the standpoint of solar radiation collection (eg. summer and winter solstices).

In most practical applications, satisfactory seasonal collection efficiency is obtained with two sets of absorptive faces, one set substantially normal to the direction of incoming solar radiation at one predetermined solar position (eg. summer solstice), and the other set substantially normal to the direction of incoming solar radiation at another predetermined solar position (eg. winter solstice). The faces of the other set additionally should intervene between and oppose the faces of the first set so that the faces acting as the primary absorbers of incident solar radiation also absorb solar radiation reflected from the faces acting in a reflective capacity. The respective angles of inclination, numbers and sizes of the faces, of course, may vary, depending upon the particular latitude that which the solar panel is to be used, the angle of inclination of the panel, seasonal collection efficiency desired, heat exchange capacity, and other factors. While preferably the corrugations which form the opposed sets of faces are generally V-shaped and therefore the faces are of planar configuration, other corrugation configurations and therefore facial contours may be used, if desired.

Of particular significance is the rigidity afforded by the aforementioned preferred partially offset corrugation construction with intermediate overlapping sheet joints. A solar panel of this construction will possess sufficient rigidity that it can be mounted with minimum support. In practical applications incident to the provision of a solar heating system for home or building application, a solar panel of this construction can be integrated into the roof structure of the building, for example, with minimal modification to the basic roof design, edge support of the panel being adequate in most instances. The corrugation construction further affords substantial fabrication economies, especially if the faces are formed of equal widths.

These and other features, objects, and advantages of the invention will become apparent in the detailed description and claims to follow taken in conjunction with the accompanying drawings.

DETAILED DESCRIPTION OF THE DRAWINGS

Figure 3:
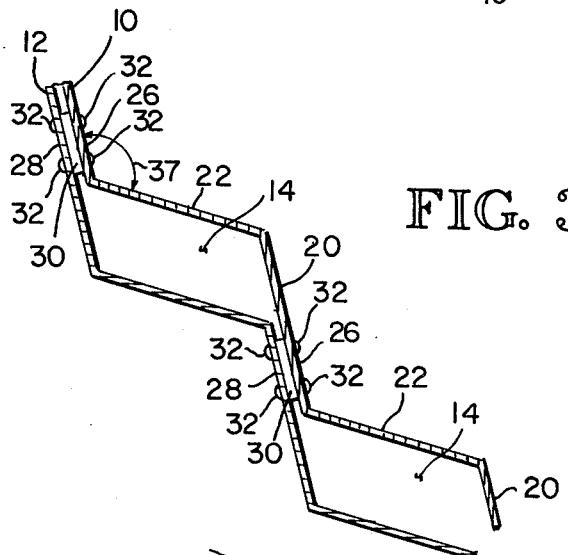
FIG. 3 is a section taken along the line 3—3 in FIG. 1.

The solar panel of this invention as illustrated in FIGS. 1-4 of the drawings includes two corrugated sheets 10 and 12 secured together with their corrugations in parallel alignment to form parallel flow channels 14 (see FIG. 3). Opposed side walls 16, 18 close the ends of the channels. Adjacent channels are connected intermediate their ends by one, two or more transverse flow passages (referenced by numerals 29 in FIG. 2) which transmit a heat exchange fluid between adjacent channels in a direction transverse to the lengths thereof, as will be described hereinafter. An inlet 17 receives a suitable heat exchange fluid and introduces it into the channel adjacent one end edge of the panel. An outlet 19 discharges the fluid from the channel adjacent the opposite end edge of the panel. The sheets 10, 12 are composed of thermally conductive material. One sheet and side wall material suited for usage in this invention is aluminum, although other materials may be used, if desired. One heat exchange fluid suited for usage in this invention is water, although other heat exchange fluids could be used.

Figure 1:
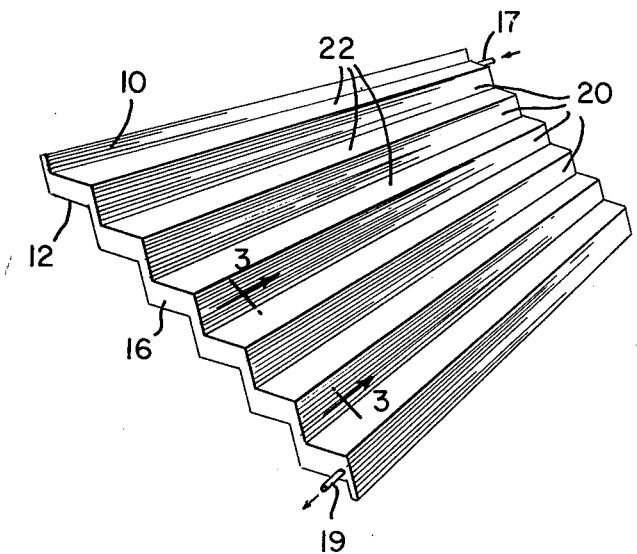
FIG. 1 is a perspective of the solar panel according to this invention.
Figure 2:
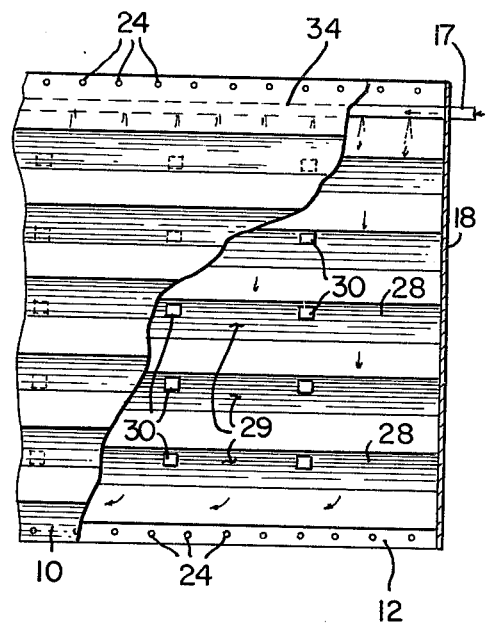
FIG. 2 is a fragmentary front elevation of the FIG. 1 solar panel with parts broken away.

In the example panel illustrated in FIGS. 1-3 of the drawings, sheet 10 forms two sets of parallel absorptive faces (the faces of one set referenced by numerals 20, the faces of the other set referenced by numerals 22) which are elongated and extend in parallel alignment the length of the panel, as shown (FIG. 1). The faces of one set are interposed between and respectively oppose the faces of the other set. Sheets 10, 12 are generally similar and, in the illustrated example, are V-corrugated so that the faces 20, 22 are of planar configuration and equal in width. They are secured together along their end edges at 24 (FIG. 2) by rivets, welding or other means. The side walls 16, 18 likewise secure the side edges of the sheets 10, 12 together and close the ends of channels 14.

Sheets 10, 12 further are so disposed that corresponding corrugations thereof are partially offset in a transverse direction, as most clearly illustrated in FIG. 3 of the drawings. Sheets 10, 12 oppose one another and are secured together by intermediate overlapping sheet joints along proximate offset portions respectively referenced by numerals 26, 28 in FIG. 3. These sheet joints coincide with square spacers 30 and serve to strengthen the panel against transverse loads. These joints also serve as demarcations for the transverse flow passages between adjacent channels.

Referring now in particular to FIGS. 2 and 3, the transverse flow passages (referenced by numerals 29 in FIG. 2) are bounded by and extend between the proximate offset portions 26, 28 at, in the example, several locations spaced along the lengths of channels 14 between spacers 30. Spacers 30 are interposed between and secured to portions 26, 28 by spot welds 32. Spacers 30 are so constructed and arranged that they maintain portions 26, 28 at such spacing that the transverse flow passages permit the heat exchange fluid to flow therethrough at a restricted flow rate and therefore control the overall rate of flow of heat exchange fluid through the panel. More specifically, spacers 30 are of such thicknesses that they space or separate portions 26, 28 at distances selected in relation to the desired height of the aforementioned transverse flow passages. The number of spacers and the distances therebetween along the lengths of channels 14 likewise are selected in relation to the desired lengths of those passages. The cross-sectional areas of the transverse flow passages obtained should be sufficient to restrict flow of heat exchange fluid between adjacent channels to a rate about equal to or slightly less than the rate at which it is introduced into the panel by inlet 17 so that the channels will remain substantially full of heat exchange fluid at all times during operation of the panel. The thicknesses, number and disposition of the spacers, of course, may vary, depending upon desired flow rate of the heat exchange fluid, nature of the heat exchange fluid used, and other factors. It will also be recognized that control of heat exchange fluid flow could be accomplished by other means.

Of particular significance from the standpoint of structural integrity is the corrugated or folded panel construction and the provision of intermediate overlapping sheet joints in the vicinity of spacers 30. The corrugated construction of sheets 10 and 12 strengthens the panel so that it can resist transverse loads. The intermediate overlapping sheet joints constituted by spacers 30 and welds 32 between proximate sheet portions 26 and 28 further strengthens the panel in this fashion. The panel therefore is light weight and possesses sufficient rigidity that it can be edge supported yet withstand applied transverse loads.

As illustrated in FIG. 2, a manifold 34 communicates with inlet 17 and extends along the channel adjacent one end edge of the panel for distributing heat exchange fluid into that channel at a plurality of locations spaced along the length thereof. The manifold is made up of a tube which includes a plurality of inlet openings spaced along the length thereof at regular intervals.

Figure 4:
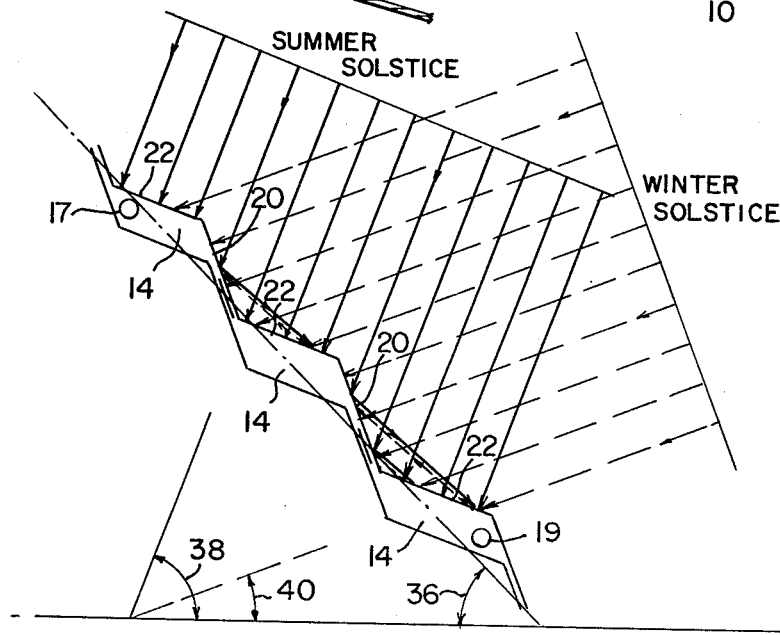
FIG. 4 is a schematic depicting operation of the FIG. 1 solar panel.

Referring now to FIG. 4, the panel is illustrated in an inclined position with the faces 20, 22 parallel to the longitudinal axis of solar travel. The panel is inclined at such an angle (referenced by numeral 36) with respect to horizontal that faces 22 are perpendicular to the direction of incident solar radiation at summer solstice, and faces 20 are perpendicular to the direction of incident solar radiation at winter solstice. At each solstice, therefore, one set of faces acts essentially as absorbers of incident solar radiation while the other acts essentially as reflectors thereof. The faces acting in their absorptive capacity, however, also absorb radiation reflected from the faces acting in their reflective capacity. In the illustrated example, it is believed that incident solar radiation will be absorbed directly by about 50% of the faces at each solstice, the remaining 50% of the faces acting essentially as reflective surfaces for directing incoming solar radiation to the former. It is believed that this construction will achieve approximately 90% absorbtion of incident solar radiation at both summer solstice and winter solstice. The illustrated panel therefore exhibits peak solar collection efficiency at both summer and winter solstices, although it could achieve peak collection efficiency at other times during the solar year by appropriate modification.

It will be recognized, of course, that the collection efficiency of the illustrated panel will fluctuate as the angle of incident solar radiation varies between summer and winter solstices. At these times, of course, the respective faces of both sets may reflect a certain amount of incident solar radiation, depending upon the angle of incidence. The choice of a particular corrugation configuration and therefore of the respective angles of inclination of faces 20, 22 therefore will depend upon desired collection or absorption efficiency for predetermined times during a solar year. In some practical applications, a translucent glass plate could be positioned in parallel overlying relation to the panel for preventing or substantially minimizing heat losses due to convection currents and reflected radiation.

According to one specific example of this invention, a solar panel suited for usage at northern latitudes of about 45 degrees may be fabricated with the included angle 37 (FIG. 3) between adjacent faces 20, 22 being about 136°. At these latitudes, the angle of incident radiation at summer solstice (referenced by numeral 38 in FIG. 4) is about 67°; the angle of incident radiation at winter solstice (referenced by numeral 40) being about 22°. In the illustrated example, the panel is positioned at an angle of inclination 36 with respect to horizontal of about 45°, or an angle which corresponds to the northern latitude angle. The angle at which the panel is inclined with respect to horizontal, in this example, corresponds to about one half the sum of the angles of incident solar radiation at summer and winter solstice. Consequently, the widths of the corrugations which respectively constitute the faces may be substantially equal, thereby simplifying panel fabrication. It will be recognized, of course, that the panel could be positioned at other angles of inclination with respect to horizontal when utilized at other latitudes, or in other applications in which the widths of the absorbtive faces need not be equal.

The illustrated angle of inclination of the panel also promotes satisfactory gravity flow of the heat exchange fluid from the inlet 17 through the various flow channels 14 in sequence toward the outlet 19. Although gravity flow of the heat exchange fluid should be sufficient in most practical panel applications, supplementary fluid pumps or fluid transfer devices could be added to the panel to promote flow of the heat exchange fluid, if desired.

Although one preferred embodiment of the invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A solar panel, comprising:
means forming multiple sets of planar absorptive faces positionable parallel to the longitudinal axis of solar travel, each set being composed of a plurality of spaced apart parallel faces positionable in perpendicular relation to the direction of incident solar radiation at a predetermined discrete solar position;
means operatively associated with said faces forming a series of closed-ended parallel flow channels underlying said faces in thermally conductive relation therewith;
means operatively connecting adjacent channels intermediate the ends thereof to transmit a heat exchange fluid between adjacent channels;
fluid inlet means operatively connected with one channel; and
fluid outlet means operatively connected with another channel.

2. The panel of claim 1, including only two sets of such faces.

3. The panel of claim 2, wherein the faces of one set are interposed between and are inclined with respect to the faces of the other set.

4. The panel of claim 1, wherein said faces are elongated and parallel to said channels.

5. The panel of claim 1, wherein said means forming said faces include a corrugated sheet, and said means forming said channels include a second sheet so disposed with respect to the first-mentioned sheet that said channels are formed therebetween.

6. The panel of claim 5, wherein said second sheet is corrugated with its corrugations in parallel alignment with the corrugations of the first-mentioned sheet.

7. The panel of claim 6, wherein said second sheet has a corrugation outline corresponding to that of the first-mentioned sheet and is so disposed with respect thereto that the corrugations of said second sheet are partially offset transversely from corresponding corrugations of the first-mentioned sheet, the panel further including means for securing the two sheets together along proximate offset portions thereof intervening between said channels.

8. The panel of claim 7, wherein said means for securing the two sheets are further operative for securing the two sheets together only at spaced apart locations along said proximate offset portions, and wherein said means operatively connecting adjacent channels include spacer means intervening between said proximate offset portions at said locations for respectively spacing said proximate offset portions to form transverse flow passages therebetween.

9. The panel of claim 1, wherein said inlet means include manifold means extending along said one channel for distributing heat exchange fluid into that channel at a plurality of locations spaced along the length thereof.

10. In a solar panel including solar radiation absorbing means; means operatively associated with said absorbing means forming a series of closed-ended parallel flow channels underlying said absorbing means in thermally conductive relation therewith, heat exchange fluid inlet and outlet means operatively associated with said flow channels, and means operatively connecting adjacent channels intermediate the ends thereof to transmit and control the flow of a heat exchange fluid between the adjacent channels.

11. A solar panel, comprising: two corrugated sheets at least one of which includes planar faces; means for securing the sheets together along their edges in opposed relation with their corrugations in parallel alignment to form closed-ended parallel flow channels; fluid inlet means connected with the channel adjacent one edge of the panel; fluid outlet means connected with the channel adjacent the opposite edge of the panel; and means for securing the sheets together between said channels at a plurality of locations along the lengths thereof while spacing opposed sheet surfaces between said locations to permit heat exchange fluid flow between adjacent channels.

12. A method of collecting solar radiation, comprising the steps of:
absorbing incident solar radiation essentially only by a first set of stationary planar absorbtive faces extending parallel to the direction of solar travel and positioned in perpendicular relation to the direction of incident solar radiation at a first predetermined solar position;
absorbing incident solar radiation essentially only by a second set of stationary planar absorbtive faces intervening between and inclined with respect to the faces of the first set at a second predetermined solar position, the faces of the second set extending parallel to the direction of solar travel and positioned in perpendicular relation to the direction of incident solar radiation at the second solar position;
reflecting incident solar radiation from the second set of faces to the first set of faces during said absorbing step at the first solar position;
reflecting incident solar radiation from the first set of faces to the second set of faces during said absorbing step at the second solar position; and
transmitting heat from the faces to a heat exchange medium during both said absorbing steps.

13. The method of claim 12, wherein the first and second solar positions respectively correspond to the two solar solstices.

14. The method of claim 12, wherein said transmitting heat step includes the step of directing a heat exchange fluid to flow downwardly through a series of horizontal closed-ended parallel flow channels in underlying thermally conductive relation with said faces and arranged side-by-side along a plane inclined at an angle corresponding to the latitude angle.

15. A method of transmitting absorbed solar energy comprising the steps of:
introducing heat exchange fluid at the inlet of a solar panel;
directing said fluid through parallel flow channels in thermally conductive relation to the absorbing means;
distributing said fluid evenly throughout the solar panel;
controlling the rate of flow of said fluid;
further directing the flow of said fluid between said channels intermediate the ends thereof; and
collecting the heated fluid at the outlet of the solar panel.

* * * * *